(12) United States Patent
Karlsson et al.

(10) Patent No.: US 9,930,594 B2
(45) Date of Patent: Mar. 27, 2018

(54) WIRELESS COMMUNICATION SYSTEM AND METHOD FOR TRAINS AND OTHER VEHICLES USING TRACKSIDE BASE STATIONS

(71) Applicant: ICOMERA AB, Göteborg (SE)

(72) Inventors: Mats Karlsson, Göteborg (SE); Peter Eklund, Göteborg (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 15/417,836

(22) Filed: Jan. 27, 2017

(65) Prior Publication Data
US 2017/0223592 A1 Aug. 3, 2017

(30) Foreign Application Priority Data
Jan. 29, 2016 (SE) ...................................... 1650111

(51) Int. Cl.
| | |
|---|---|
| H04W 36/16 | (2009.01) |
| H04W 36/08 | (2009.01) |
| H04W 48/04 | (2009.01) |
| H04W 84/00 | (2009.01) |
| H04W 84/12 | (2009.01) |
| H04W 88/10 | (2009.01) |

(52) U.S. Cl.
CPC ......... *H04W 36/165* (2013.01); *H04W 36/08* (2013.01); *H04W 48/04* (2013.01); *H04W 84/005* (2013.01); *H04W 84/12* (2013.01); *H04W 88/10* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2005/0174974 A1 | 8/2005 | Sonntag et al. | |
| 2005/0249145 A1 | 11/2005 | Wilson | |

FOREIGN PATENT DOCUMENTS

| | | |
|---|---|---|
| EP | 1 175 757 | 1/2002 |
| GB | 2 389 015 A | 11/2003 |
| WO | WO 2015/169917 A1 | 11/2015 |

OTHER PUBLICATIONS

The extended European Search Report dated May 30, 2017, by the European Patent Office in corresponding European Patent Application No. 17152895.3-1854. (12 pages).

*Primary Examiner* — Kwang B Yao
*Assistant Examiner* — Adam Duda
(74) *Attorney, Agent, or Firm* — Buchanan Ingersoll & Rooney P.C.

(57) ABSTRACT

A method and system for wireless communication with a mobile router in a moving vehicle, such as a train, and an external wireless network is disclosed. The external network includes a plurality of trackside base stations distributed along a path of travel. The method includes: determining the presence of a mobile router within the access area of a trackside base station, and when the presence of a mobile router has been determined: setting the power of the trackside base station to a high power mode; determining a direction of travel of the vehicle; setting the power of at least one trackside base station arranged in the forward direction of the base station for which the mobile router has been detected to a high power mode; and setting the power of at least one trackside base station arranged in the backward direction of the base station to a low power mode.

14 Claims, 3 Drawing Sheets

WIRELESS COMMUNICATION SYSTEM AND METHOD FOR TRAINS AND OTHER VEHICLES USING TRACKSIDE BASE STATIONS

TECHNICAL FIELD OF THE INVENTION

The present invention relates to a wireless communication method and system for moving vehicles, such as trains, and in particular a method/system allowing more efficient communication between the moving vehicle and a stationary external communication network with trackside base stations, e.g. using a WLAN standard, and in particular using the IEEE 802.11 standard.

BACKGROUND

The demands on wireless communication capabilities in today's society are increasing rapidly. In particular, fast and easily accessible communication is desired through handheld devices over large areas. It is particularly challenging to achieve such communication for mobile devices which are moving, e.g. when moving over large distances with poor network coverage or when affected by unknown sources of noise interrupting a signal for communication, such as clients moving on e.g. trains, airplanes, and other types of moving vehicles. In particular, if a client, such as a mobile phone, moves over large areas the client has to connect to several base stations in order to maintain a sufficient connection for communication.

Further, e.g. train carriages are made of metal, and even the windows are normally covered with a metal film. Accordingly, train carriages are shielded compartments, and direct communication between terminal antennas within the carriages and externally located antennas is difficult to obtain.

The mobile nature of a client with respect to the base stations may also introduce several potential sources of communication performance degradation. Such sources may derive from complex terrain, competition for available channels, or the source may be an unknown source of noise related to e.g. radio-frequency interference.

At the same time, there is today an increasing demand from passengers to be able to communicate through mobile phones and other handheld terminals when travelling on e.g. trains, and also to be able to get access to the Internet with laptops, PDAs etc. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains and airplanes, and trains are in addition facing problems with poor line-of-sight between the base stations and the train. This puts a strain on the wireless network infrastructure, leading to poor performance.

To this end, moving vehicles, such as train carriages, are often provided with an external antenna connected to a repeater unit within the carriage, which in turn is connected to an internal antenna. Hence, the communication between the passengers' terminals and the operator antennas outside the vehicle occurs through the repeater unit. Similarly, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 and WO 15/169917 by the same applicant. This method has greatly improved the reliability of high-bandwidth wireless communication for trains and other large vehicles. However, this solution may still be insufficient to obtain an optimal transmission performance, especially for large data volumes. Trains and other moving vehicles often pass through areas with bad radio coverage, and present solutions are often unable to handle the required traffic.

Further, e.g. the current rising trend of streaming media uses far more data per minute of journey per passenger than older uses of the Internet, such as browsing text- and image-based sites like Facebook, or checking and responding to email.

Further, it is known to communicate with trains and other vehicles through dedicated base stations arranged sequentially along the rail track, and with a certain distance apart. Such base stations are generally referred to as trackside base stations or trackside access points. However, it has been found that communication via trackside base stations performs very poorly for many communication standards, such as for WLAN standards. In particular, high power is often needed to obtain adequate communication performance, and also a large number of trackside base stations. Thus, such trackside communication systems are very costly both to install and to operate. Further, the operational performance is often poor. This is e.g. due to the fact that the trackside base stations one the one hand cannot be arranged too far away from each other, since the performance deteriorates rapidly when the distance increases, and on the other hand, closely arranged trackside base stations interfere with each other, making efficient communication problematic.

There is therefore a need for an improved method and system for communicating with clients on moving vehicles, and in particular trains, allowing increased capacity, capacity utilization, quality and/or cost-efficiency. Even though the above discussion is focused on trains, similar situations and problems are encountered in many other types of moving vehicles, and in particular moving passenger vehicles, such as buses, ships and airplanes.

SUMMARY OF THE INVENTION

It is therefore an object of the present invention to provide a method for wireless communication and a wireless communication system for moving vehicles, and in particular a train, which alleviates all or at least some of the above-discussed drawbacks of the presently known systems.

This object is achieved by means of a wireless communication method and system for a moving vehicle, such as a train as defined in the appended claims.

According to a first aspect of the invention, there is provided a method for wireless communication with a mobile router in a moving vehicle, such as a train, and an external wireless network comprising a plurality of trackside base stations, such as access points for communication in compliance with a Wireless Local Area Network (WLAN), said base stations distributed along a vehicle path of travel, such as a train route, the method comprising:

determining the presence of a mobile router within the access area of any of said plurality of trackside base stations, and when the presence of a mobile router has been determined:

setting the power of said trackside base station for which the mobile router has been detected to a high power mode;

determining a direction of travel of said vehicle;
setting the power of at least one trackside base station arranged in the forward direction of the base station for which the mobile router has been detected, as seen in the determined direction of travel, to a high power mode; and
setting the power of at least one trackside base station arranged in the backward direction of the base station for which the mobile router has been detected, as seen in the determined direction of travel, to a low power mode.

The "router" or "mobile router" is a networking router, which is a machine that forwards data packets between computer networks, on at least one data link in each direction. The router may be a mobile access router, and preferably a mobile access and applications router.

By "low power mode" is meant a power mode significantly lower than for the high power mode. In the low power mode, the power may be set to zero, i.e. without any emitted power at all. However, preferably, the low power mode has a non-zero power, thereby allowing communication with the base station also when operated in the low power mode, but with reduced performance, and optionally only at close range.

By switching between a low power mode, which may be used as a default, and a high power mode for the trackside base stations, it becomes possible to "activate" only the base stations in the vicinity of the vehicle with the mobile router, whereas other base stations, farther away, and with which the mobile router would anyway not be able to communicate efficiently, may be set in a low power mode. Hereby, the communication efficiency is improved, since interference between the base stations is reduced. Further, the operation becomes much more cost-effective, since the power is now allocated and used only where it is needed, providing substantial savings in the overall power used.

The method is preferably executed by a controller, being part of or connected to the exterior mobile network, and in communication with the trackside base stations. The method can be implemented and realized solely or to a large extent in software, but may also, to some extent or even completely be realized in hardware.

In a preferred embodiment, the vehicle route/path is predetermined and the external wireless network comprising a plurality of trackside base stations, such as trackside access points, distributed along a vehicle path of travel, and located along the predetermined route. A spatial separation between at least one of the plurality of base stations/access points and the predetermined route (such as a train track) is optionally based on one or more of: the height of an antenna of the cell; a height of the vehicle; a maximum, minimum or average distance between the vehicle and the antenna; and the frequency of communication.

The system may comprise a plurality of masts, each mast having at least one antenna structure or construction mounted thereupon. Each antenna structure or construction may be coupled to a respective, separate base station/access point for communication with the vehicle-based mobile router, although in some embodiments, multiple antenna structures or constructions on the same mast may be coupled to the same bae station/access point, or provide two or more base stations/access points. The base stations/access points may be connected to each other, to a network backhaul using e.g. an optical fibre system.

The masts, and consequently the trackside base stations, may be spatially separated from one another, for example at regular intervals. They are typically located along a dedicated or predetermined route of the vehicle-based mobile router, such as a train track. This spatial separation may be selected on the basis of cellular radio network coverage. The distance between each mast and a dedicated route of the vehicle-based mobile terminal, such as a track may be based on one or more of: the height of the antenna on the mast; the height of the mast; the height of the vehicle; the maximum, minimum or average distance between the vehicle and the mast (or a combination of these values); and the frequency of communication.

The new solution provides better performance than previously known WLAN solutions when used on trains and other vehicles. By means of the present invention, efficient WLAN communication is provided when the access points are provided more than 1 km apart along the vehicle path of travel (such as the train rail), and even when more than 5 km apart, and more than 10 km apart, and more than 20 km apart. Preferably, the access points are arranged with a separating distance in the range 1-20 km, and more preferably in the range 2-20 km, and most preferably in the range 5-20 km, such as 10-20 km.

The communication between the trackside base stations and the mobile router is preferably made in compliance with a WLAN standard, and most preferably in compliance with the IEEE 802.11 standard (which may also be referred to as WiFi). However, it is also possible to use other wireless communication protocols.

The determination of whether there is a mobile router within the access area of any of said plurality of trackside base stations is preferably made by detection in the trackside base stations, and by forwarding information regarding this to the controller. However, alternatively or additionally, this determination can also be made based on GNSS (Global Navigation Satellite System) signals, such as GPS signals, received by the mobile router. In this case, exact position data can be communicated to the controller, and by knowing the positioning and coverage areas of the trackside base stations, the controller can determine in which coverage area(s) the mobile router is present. Further, the controller may predict this based on the timing and sequence of base stations in which the mobile router has been previously.

Similarly, the direction of travel for the vehicle may be determined in various ways. For example, the positioning data received by GNSS/GPS signals in the mobile router may be used to this end, the sequence of trackside base stations in the coverage areas of which the mobile router has been may be used, etc.

In a preferred embodiment, the mobile routers are arranged to receive GNSS/GPS data, and communicate this to the external mobile network, said GNSS/GPS data being useable to detect the presence of the mobile router within the access area of any of said plurality of trackside base stations.

In another preferred embodiment, both the mobile routers and the trackside base stations are in communication with a control server, said server comprising information of the positioning of the trackside base stations, and being arranged to control the trackside base stations to assume either of the low and high power modes. The mobile routers may then be arranged to, preferably continuously or regularly, send information to the control server about their present positions. Alternatively or additionally, the trackside base stations are arranged to, preferably continuously or repeatedly, send information to the control server about mobile routers being determined to be within their access area.

Preferably, the controller comprises or is connected to a database comprising data at least about the identity of the trackside base stations and the positioning of the trackside base stations, and optionally also about the coverage area of the trackside base stations in relation to the vehicle path. The controller also preferably comprises a list of the operational states in which the trackside base stations are in (high power mode, low power mode, and optional intermediate power level modes). The controller also, preferably, retains information not only in which base station coverage area the mobile routers are at present, but also in which base station coverage area they were previously. Hereby, even if the mobile routers fails to receive GNSS/GPS signals, or fails to communicate this data to the controller, the controller may still be able to determine the present and future position of the mobile router, and control the operational states of the base stations accordingly.

The control server may also be arranged to determine the direction of travel of each mobile router based on the position data from each mobile router. Additionally or alternatively, the control server may be arranged to determine the direction of travel of each mobile router by the sequence of trackside base stations in which the mobile routers are present.

The low power mode is preferably set to such a power that communication with mobile routers is still possible, at least at close range. The low power mode may be set to zero, and this would optimize the savings in respect of used power. However, it is preferred to use a low power slightly above zero in the low power mode, so that mobile routers may achieve communication access to the trackside base stations when in the low power mode at least at a close range. Hereby, mobile routers which have lost communication with the system, for example due to lost tracking in the controller, may resume the communication again. For example, the loss of GNSS/GPS signals in the mobile router may in some instances lead to situations where the mobile router is "lost" by the controller, so that no trackside base stations are set in high power mode when the vehicle approaches. However, by ensuring that some communication is possible also in the low power mode, the mobile router will again be detected at least when it passes the next trackside base station, and the communication method as discussed above can then be resumed.

The trackside base stations/access points are preferably arranged so that there is at least some overlap between the coverage areas for neighboring trackside base stations. When a vehicle travels through this overlap area, a conventional handover may be performed from the previously passed trackside base stations to the trackside base stations ahead of the vehicle.

However, by means of the present invention, the coverage areas of the trackside base stations are preferably arranged with a relatively large overlap area. Preferably, the coverage areas are provided such that the mobile routers will at most time have access to at least two trackside base stations—one ahead of the vehicle and one behind the vehicle. This can be used to enable simultaneous communication with more than one trackside base stations. Thus, the mobile router can preferably be arranged to simultaneously communicate with the external mobile network through at least two trackside base stations when more than one trackside base stations is accessible for the mobile router, thereby providing two concurrently useable data links. This enhances the communication performance significantly, and also alleviates the problems related to handovers.

Alternatively or additionally, the mobile router may be arranged to simultaneously communicate with at least one further external wireless network, thereby providing at least one further concurrently useable data link.

When several data links are available, the mobile router is preferably arranged to evaluate the quality of said data links, e.g. on a host layer and e.g. by repeatedly sending requests arranged to trigger a determinable automated response to said stationary communication server via said data links and measure the time until the triggered automated responses are received; and assigning data streams to said data links at least partly based on said evaluated quality.

Further, the mobile router in the moving vehicle may be arranged to receive and transmit wireless data packets to and from a stationary communication server outside the moving vehicle through the at least one exterior mobile network via at least one antenna, and to and from at least one client onboard the moving vehicle.

When the router is arranged to communicate with the communication server on at least two different data links (communication routes) having different characteristics, the router may be arranged to automatically separate the communication traffic between said data links based on an evaluation of the quality. The data streams may then be forwarded on one or several links to and from a dedicated external server, which may be referred to as an aggregation server or gateway. The different links thereby form a single virtual link between the router and the gateway.

The communication can be automatically optimized based on the evaluation, and also optionally on other conditions, such as price, speed, latency, etc. Thus, in addition to the evaluation, prioritizing and assignments may be made based on other static or dynamic parameters, such as signal strength and the like. Such further optimizations are per se known from EP 1 175 757 and WO 15/169917 by the same applicant, said documents hereby being incorporated by reference. An automatic selection is then made among the available data links to use the most efficient combination. Hence, a seamless distribution of the data among the different data links is obtained.

The router may, in addition to the trackside WLAN (or other protocol used for the communication with the trackside base stations), use any available data links, such as GSM, Satellite, DVB-T, HSPA, EDGE, 1xRTT, EVDO, LTE, Wi-Fi and WiMAX; and optionally combine them into one virtual network connection. In particular, it is preferred to use data links provided through wireless wide-area network (WWAN) communication technologies.

The selection of links is preferably made once for each data stream. However, re-selection for data streams that have failed may also be made. Further, data streams may also be split among two or more data links, e.g. by transferring a first part of a data stream on one data link to begin with, and then continue the transfer of the rest of the data stream on another data link, based on a re-assignment decision. Re-selection and/or re-assignment may also be made based on other criteria than complete failure of the presently used data link, such as when the evaluated quality of the link presently used is significantly deteriorated, falls below a certain threshold, or the like.

According to another aspect of the invention, there is provided a computer-readable storage medium encoded with instructions for executing in a wireless device the instructions, when executed, performing the above-discussed method.

With this aspect of the invention, similar advantages and preferred features are present as in the previously discussed first aspect of the invention.

According to still another aspect of the invention, there is provided a wireless communication system for wireless communication between a mobile router in a moving vehicle, such as a train, and an external wireless network comprising a plurality of trackside base stations, such as access points for communication in compliance with a Wireless Local Area Network (WLAN), said base stations distributed along a vehicle path of travel, such as a train route, the system comprising a controller including a processor being connected to the trackside base stations, and list of said plurality of trackside base stations and the operational state of said trackside base stations, wherein the control is arranged to:

determining the presence of one or several mobile router(s) within the access area of any of said plurality of trackside base stations;

updating the operational state of the base station in said list in accordance with this determination, so that all trackside base stations having a mobile router in their coverage area(s), and at least one trackside base station ahead and behind this base station, respectively, are set in one or several high power mode(s), and other trackside base stations are set in a low power mode;

sending control instructions to the trackside base stations to assume the determined operational states in accordance with the updated list.

Also with this aspect of the invention, similar advantages and preferred features are present as in the previously discussed first aspect of the invention.

As discussed above, all the trackside base stations, are preferably as a default operated in a low power mode, wherein high power mode are only used when control signals to use a high power mode have been sent from the controller.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the detailed embodiments described in the following are related to trains. However, it is to be acknowledged by the skilled reader that the method and system are correspondingly useable on other moving vehicles, such as buses, ferries, airplanes and the like.

Figure 1:
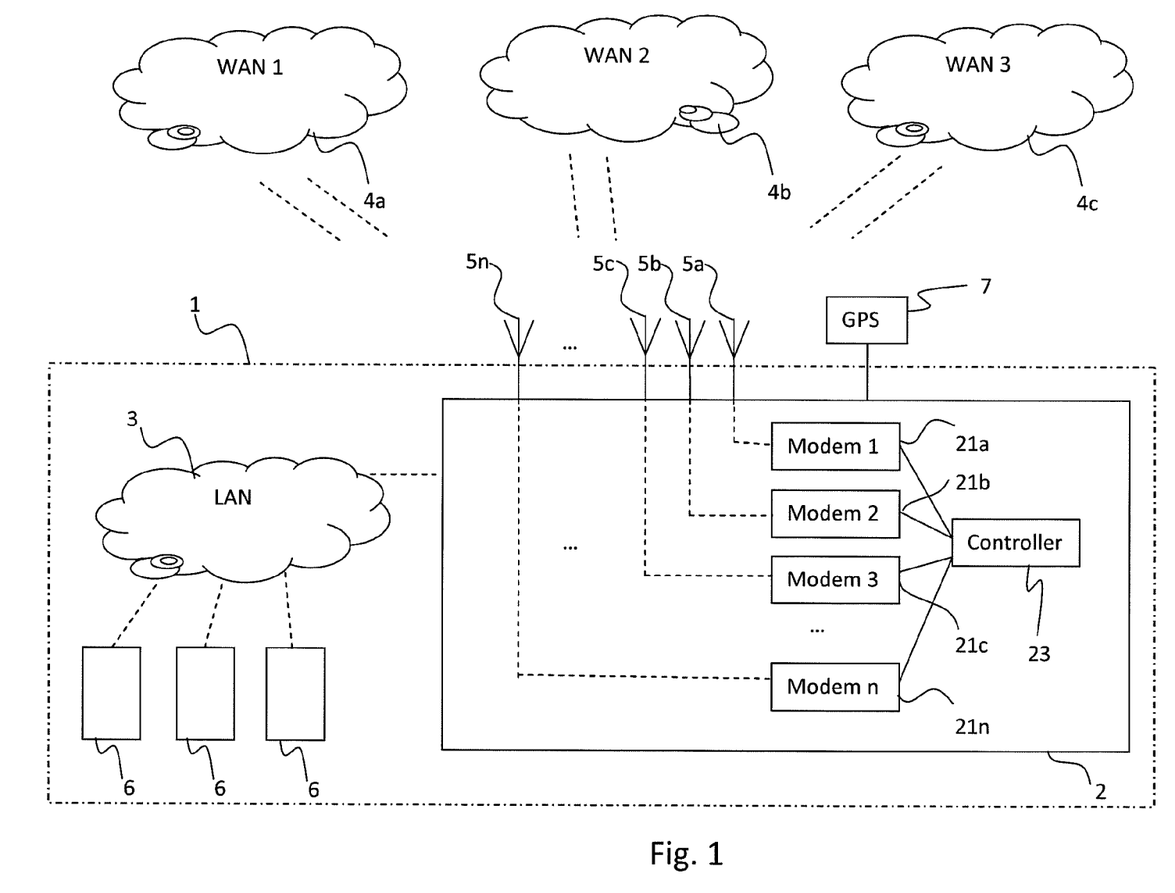
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c, including at least one external network having a plurality of trackside base stations/access points distributed along a vehicle path of travel, preferably for communication in compliance with a Wireless Local Area Network (WLAN) standard, such as an 802.11 standard.

Communication to and from the WANs is provided through one or several antennas 5a-n arranged on the train, the antennas may be arranged on the roof of the train, on window panes of the train, etc. Two or more data links are preferably available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs, tablets and so on.

The data communication router further preferably comprises a plurality of modems 21a-n. Assignment of data streams to different WANs and/or to different data links on one WAN is controlled by a router controller 23. The router controller 23 is preferably realized as a software controlled processor. However, the router controller may alternatively be realized wholly or partly in hardware.

The system may also comprise a receiver for receiving GNSS (Global Navigation Satellite System) signals, such as a global positioning system (GPS) receiver 7 for receiving GPS signals, indicative of the current position of the vehicle, and wherein the controller may be arranged to control in particular the performance of the communication with the trackside base stations in accordance with the vehicle position determined based on the GNSS/GPS signals.

The data communication router may also be denominated MAR (Mobile Access Router) or MAAR (Mobile Access and Applications Router).

Figure 2:
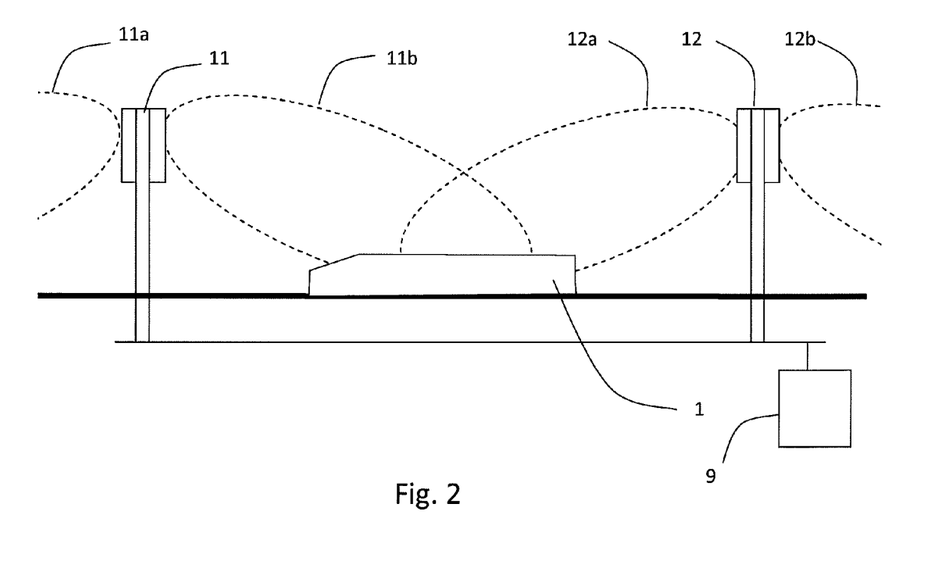
FIG. 2 is a schematic illustration of a train being associated with two trackside base stations of an external mobile network, in accordance with an embodiment of the present invention.

In FIG. 2, the external wide area network (WAN) including a plurality of trackside base stations, such as trackside access points, distributed along a vehicle path of travel, i.e. the rail, for communication in compliance with a Wireless Local Area Network (WLAN) standard, such as an 802.11 standard, is illustrated in more detail. The external mobile network comprises a plurality of trackside base stations 11, 12, arranged along the vehicle path. The base stations have coverage areas 11a, 11b, 12a, 12b extending in both directions along the vehicle path. The coverage areas on the two sides of the base stations may be related to the same base station/access point, or to different base stations/access points. Thus, coverage area 11a and 11b may be related to the same base station/access point, or be operated independently, as different base stations/access points, and the same applies to coverage areas 12a and 12b, etc.

The base stations/access points are connected to a controller 9, via a wired or wireless connection, such as via a fiber connection. The controller is preferably realized on a processor, and at least partly in software. However, the controller may also be realized on several processors, in a distributed fashion.

The base stations are operable in at least two different modes—a low power mode, providing a limited or very limited coverage area, and a high power mode providing a large coverage area. However, one or more intermediate power modes may also be used. Which power mode to used is preferably controlled by the controller 9, as will be discussed in more detail in the following.

The coverage areas for the high power mode are preferably overlapping, allowing the mobile router of the vehicle to access several access points simultaneously, and thereby distribute the communication between several data links.

The mobile router may also be connected to other external networks, and may consequently simultaneously distribute the communication also over these networks.

Figure 3:
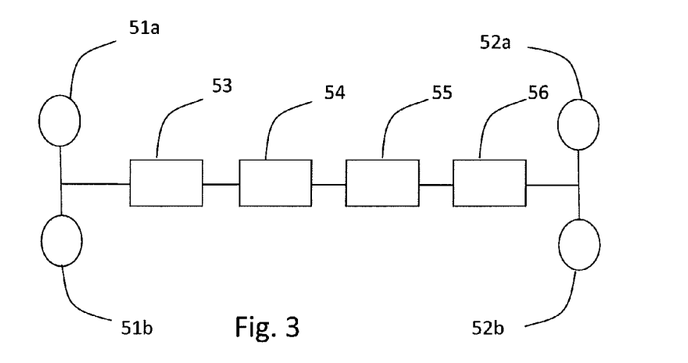
FIG. 3 is a schematic illustration of an antenna configuration to be used on trains in the systems of FIGS. 1 and 2.

Thus, the vehicle preferably comprises a plurality of antennas, for communicating with different links and different external networks. A schematic illustration of this is provided in FIG. 3. This antenna arrangement, for example arranged on the roof of the train, may comprise directional antennas 51a and 51b directed to access points in the backward direction of the train, directional antennas 52a and 52b directed to access points in the forward direction of the train, and additional antennas 53-56 arranged to communicate with base stations of other external networks, e.g. via GSM, Satellite, DVB-T, HSPA, EDGE, 1×RTT, EVDO, LTE, Wi-Fi (apart from the trackside WLAN) and WiMAX.

Figure 4A:
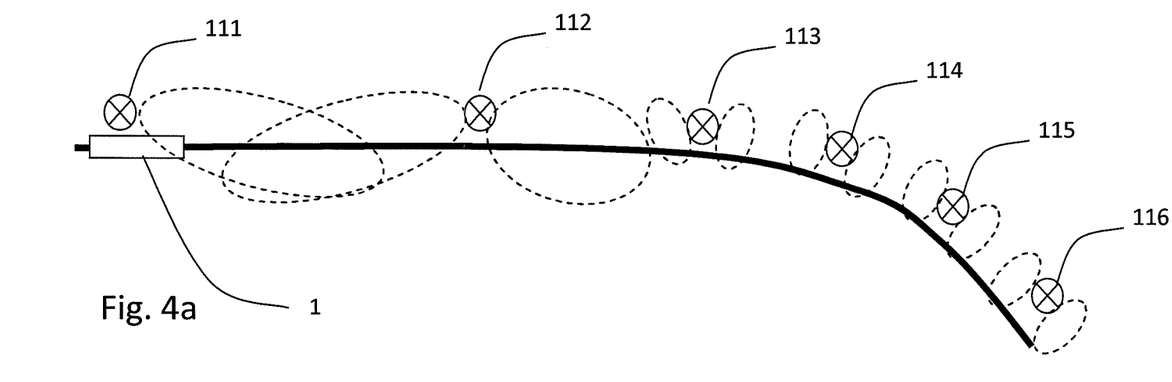
FIGS. 4a and b is a schematic illustration of a train being associated with various trackside base stations of an external mobile network during travel, in accordance with an embodiment of the present invention.
Figure 4B:
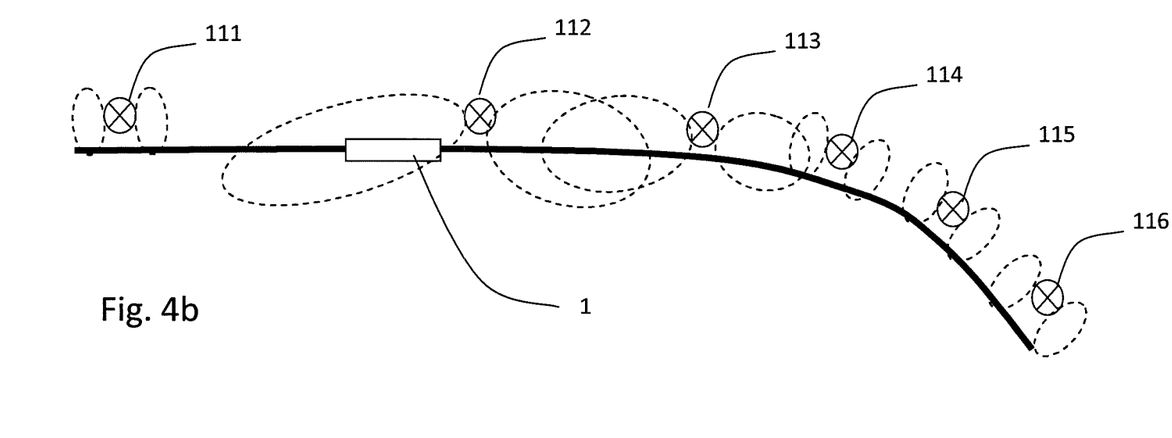

An exemplary embodiment for communicating with the trackside base stations/access points will now be described with reference to FIGS. 4a and b.

Here, a train 1 travels on a railway track, along which a plurality of trackside base stations 111-116 are located. The base stations are preferably as a default operated in a low power mode. In the position of the train as indicated in FIG. 4a, the train is within the coverage area of base station 111, and this base station 111 has been activated by the controller 9 to be in a high power mode. The position and direction of travel for the train is determined by the controller 9, for example based on information, such as GNSS/GPS information, received from the mobile router on the train, and/or information received from the trackside base stations.

Here, it is determined by the controller that the train is in the coverage area of trackside base station 111, and travelling towards trackside base station 112. As a result, the controller sends control instructions to the base station 112 to set this base station in a high power mode. Also, the trackside base station (not shown) which has been passed prior to base station 111 is reset to a low power mode.

In FIG. 4b, the train has moved on to the coverage area of base station 112. When this has been determined by the controller, the next trackside base station ahead of the train, base station 113 is set to a high power mode, thereby being ready to communicate with the train as soon as it enters the coverage area, and base station 111, which is now way behind the train, is reset to a low power mode.

In this way, only a few trackside base stations are active in relation to one mobile router at the time. For example, it is possible to activate only two trackside base station at a time, so that as soon as the train comes into the coverage area of the next base station, the previous base station is reset to a low power mode, and the coming base station ahead of the train is powered up to high power mode. However, it is also possible to maintain 3, 4 or even more base stations active around the train, such as maintaining a state where the coming two or three base stations are active ahead of the train, or maintaining also the last, or even the two or three last passed base stations active. Maintaining more base stations active requires more power, but provides better communication performance and increased security. It is also very useful when the mobile routers are arranged to communicate with two or more trackside access points simultaneously.

However, when communicating on several data links simultaneously, these two or more parallel links may be controlled independently, so that one process in the controller controls one of the modems/link for the mobile router, in the way discussed in the foregoing, and another, separate process run in parallel with the first, is used to control the other modem/link.

Further, the same process may also be used independently for several mobile routers and vehicles at the same time. Thus, the trackside base stations may receive instructions to use high power mode or low power mode from several such parallel processes at about the same time. In such a case, the controller is preferably arranged to aggregate the instructions to each trackside base station, so the base stations do not receive incompatible instructions from the two or more parallel processes.

In case one or more intermediate power level are provided and useable by the base stations, the controller may further be arranged to maintain 2-3 base stations in the vicinity of the train active, i.e. in a high power mode, and 1-2 base stations immediately outside this active area in a semi-active state, i.e. in an intermediate power mode, and other base stations, outside this active and semi-active area, in a idle, low power mode.

Thus, the controller preferably comprises a list of the trackside base stations, and the operational states in which they are operating (low power mode, high power mode, and optional intermediate power modes). The controller continuously or regularly determines the position of the mobile routers, and updates the list, so that all trackside base stations having mobile routers in their coverage are set to a high power mode, all trackside base stations adjacent to these base stations, such as 0-2 base stations in the rearward direction and 1-3 base stations in the forward direction, are also set in a high power mode, or optionally in an intermediate power mode, and all other trackside base stations are returned to a low power mode. The content of the updated list is then communicated to the trackside base stations, so that the base stations receive instructions about which operational state to operate in.

The invention has now been described with reference to specific embodiments. However, several variations of the communication system/method are feasible. For example, the present invention has here been disclosed in relation to trains, where it is considered to be particularly advantageous. However, it may also be implemented and used on other moving vehicles, and in particular vehicles intended for passenger traffic, such as buses, ferries, airplanes, etc. Further, the examples are mostly related to the 802.11 standard, but other WLAN protocols may also be used in the same or similar ways, and it is also possible to use the same method and system for communication in compliance with other communication protocols and standards.

Further, the above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for wireless communication with a mobile router in a moving vehicle and an external wireless network comprising a plurality of trackside base stations, said base stations distributed along a vehicle path of travel, the method comprising:
   determining the presence of a mobile router within the access area of any of said plurality of trackside base stations, and when the presence of a mobile router has been determined:
      setting the power of said trackside base station for which the mobile router has been detected to a high power mode;
   determining a direction of travel of said vehicle;
   setting the power of at least one trackside base station arranged in the forward direction of the base station for which the mobile router has been detected, as seen in the determined direction of travel, to a high power mode; and
   setting the power of at least one trackside base station arranged in the backward direction of the base station for which the mobile router has been detected, as seen in the determined direction of travel, to a low power mode.

2. The method of claim 1, wherein the mobile routers are arranged to receive GNSS data, and communicate this to the external mobile network, said GNSS data being useable to detect the presence of the mobile router within the access area of any of said plurality of trackside base stations.

3. The method of claim 1, wherein both the mobile routers and the trackside base stations are in communication with a control server, said server comprising information of the positioning of the trackside base stations, and being arranged to control the trackside base stations to assume either of the low and high power modes.

4. The method of claim 3, wherein the mobile routers are arranged to send information to the control server about their present positions.

5. The method of claim 3, wherein the trackside base stations are arranged to send information to the control server about mobile routers being determined to be within their access area.

6. The method of claim 3, wherein the control server is arranged to determine the direction of travel of each mobile router based on the position data from each mobile router.

7. The method of claim 3, wherein the control server is arranged to determine the direction of travel of each mobile router by the sequence of trackside base stations in which the mobile routers are present.

8. The method of claim 1, wherein the low power mode is set to such a power that communication with mobile routers is still possible, at least at close range.

9. The method claim 1, wherein the mobile router is arranged to simultaneously communicate with the external mobile network through at least two trackside base stations when more than one trackside base station are accessible for the mobile router, thereby providing two concurrently useable data links.

10. The method of claim 1, wherein the mobile router is further arranged to simultaneously communicate with at least one further external wireless network, thereby providing at least one further concurrently useable data link.

11. The method of claim 10, wherein the mobile router is arranged to evaluate the quality of said data links; and
   assigning data streams to said data links at least partly based on said evaluated quality.

12. The method of claim 1, wherein all the trackside base stations, as a default are operated in a low power mode.

13. A computer-readable storage medium encoded with instructions for executing in a wireless device the instructions, when executed, performing a method as defined in claim 1.

14. A wireless communication system for wireless communication between a mobile router in a moving vehicle and an external wireless network comprising a plurality of trackside base stations, said base stations distributed along a vehicle path of travel, the system comprising a controller including a processor being connected to the trackside base stations, and list of said plurality of trackside base stations and the operational state of said trackside base stations, wherein the control is arranged to:

determining the presence of one or several mobile router(s) within the access area of any of said plurality of trackside base stations;

updating the operational state of the base station in said list in accordance with this determination, so that all trackside base stations having a mobile router in their coverage area(s), and at least one trackside base station ahead and behind this base station, respectively, are set in one or several high power mode(s), and other trackside base stations are set in a low power mode;

sending control instructions to the trackside base stations to assume the determined operational states in accordance with the updated list.

* * * * *